United States Patent
Boals

(10) Patent No.: US 10,838,812 B2
(45) Date of Patent: Nov. 17, 2020

(54) STORING PARITY DATA MID STRIPE

(71) Applicant: Micron Technology, Inc., Boise, ID (US)

(72) Inventor: Daniel A. Boals, Broomfield, CO (US)

(73) Assignee: Micron Technology, Inc., Boise, ID (US)

( * ) Notice: Subject to any disclaimer, the term of this patent is extended or adjusted under 35 U.S.C. 154(b) by 50 days.

(21) Appl. No.: 16/190,006

(22) Filed: Nov. 13, 2018

(65) Prior Publication Data
US 2020/0151059 A1 May 14, 2020

(51) Int. Cl.
*G06F 11/10* (2006.01)
*G06F 3/06* (2006.01)

(52) U.S. Cl.
CPC .......... *G06F 11/1076* (2013.01); *G06F 3/064* (2013.01); *G06F 3/0619* (2013.01); *G06F 3/0679* (2013.01)

(58) Field of Classification Search
CPC .. G06F 11/1076; G06F 3/0619; G06F 3/0679; G06F 3/064
See application file for complete search history.

(56) References Cited

U.S. PATENT DOCUMENTS

| | | | | |
|---|---|---|---|---|
| 10,303,560 B2* | 5/2019 | Nelogal | ............. | G06F 11/1469 |
| 2012/0151253 A1* | 6/2012 | Horn | .................. | G06F 12/0804 714/6.22 |
| 2017/0003981 A1* | 1/2017 | Erez | ...................... | G06F 9/4418 |
| 2018/0232277 A1* | 8/2018 | Nelogal | ............. | G06F 12/0804 |
| 2019/0012111 A1* | 1/2019 | Li | .......................... | G06F 3/0655 |
| 2019/0213075 A1* | 7/2019 | Kim | ...................... | G06F 3/0673 |

* cited by examiner

*Primary Examiner* — Thien Nguyen
(74) *Attorney, Agent, or Firm* — Lowenstein Sandler LLP

(57) ABSTRACT

User data to be stored at a data block location of a plurality of data block locations at a storage system may be received. A parity data based on the received user data may be generated. An indication of an occurrence of an event associated with the storage system may be received. In response to receiving the indication of the occurrence of the event, the parity data may be stored by a processing device at a particular data block location of the plurality of data block locations where the particular data block location is situated prior to another data block location, of the plurality of data block locations, that is to store another parity data based on a subsequent user data.

20 Claims, 7 Drawing Sheets

STORING PARITY DATA MID STRIPE

TECHNICAL FIELD

The present disclosure generally relates to a storage system, and more specifically, relates to storing parity data at a location prior to the end of a data block stripe.

BACKGROUND

A storage system may include one or more memory components that store data. For example, a solid-state drive (SSD) may include memory devices such as non-volatile memory devices. The SSD may further include an SSD controller that may manage each of the memory devices and allocate data to be stored at the memory devices. A host system may utilize the SSD and request data from the SSD. The SSD controller may be used to retrieve data from the corresponding memory devices and return the retrieved data to the host system.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
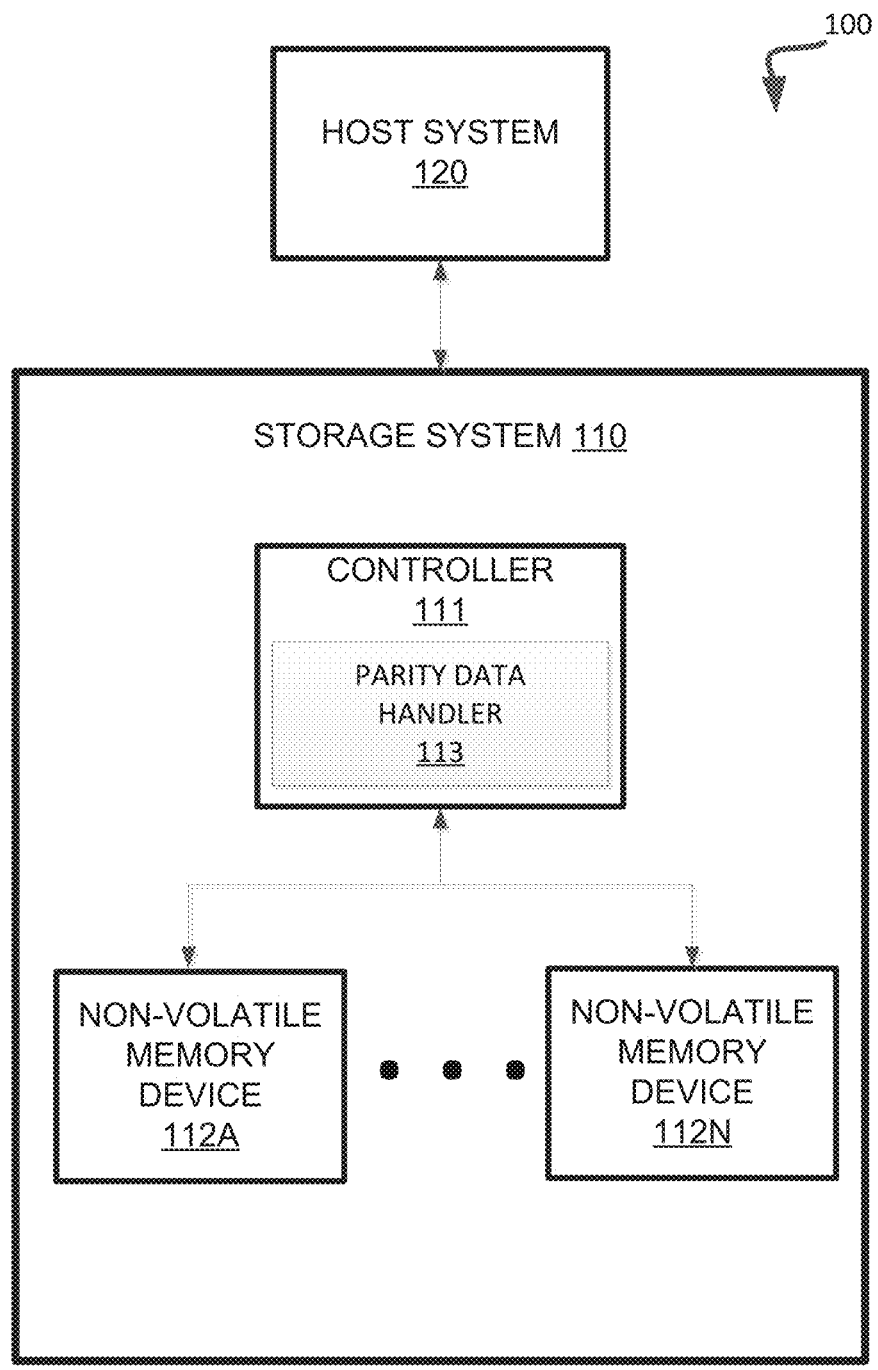
FIG. 1 illustrates an example computing environment that includes a storage system in accordance with some embodiments of the present disclosure.

Aspects of the present disclosure are directed to storing parity data at a location prior to the end of a data block stripe. In general, a host system may utilize a storage system to store data. The host system may provide data to be stored at the storage system. The data may be stored and retrieved from the memory devices within the storage system. An example of a storage system is a solid-state drive (SSD) that includes non-volatile memory and a controller to manage the non-volatile memory.

The controller may manage the storing of data and may implement a redundancy operation as the data is written to the memory devices of the storage system. For example, a redundant array of independent NAND (RAIN) operation may be implemented by the controller to provide redundancy for the data stored on the storage system. The redundancy operation may protect the data against a failure of a portion of a memory device that is storing the data. For example, parity data may be generated when writing data received from the host system to the storage system. The parity data may be generated based on an exclusive-or (XOR) operation with the received data from the host system and may be used to reconstruct or recalculate the data in the event of a failure of the portion of the memory device that is storing data from the host system. As an example, the parity data may be calculated for a particular number of user data blocks and the parity data may be stored along with the user data blocks at different portions or locations of memory devices. If a portion of a memory device that includes one of the user data blocks fails and the corresponding data is lost, then the lost data may be recalculated or reconstructed based on an XOR operation between the other user data blocks and the parity data.

In an example, the received user data and the parity data may be stored at data block locations of multiple data block locations of the storage system. For example, the data block locations may be NAND (negative-and) type memory locations and the multiple data blocks may be a "RAIN stripe" of data block locations where the data block locations store a specified number of user data and a parity data based on the specified number of user data. A RAIN stripe may be described as a "N to 1 RAIN Stripe" or "N:1 RAIN stripe" where N is the number of user data elements associated with a single parity element on a single stripe of data block locations. For example, if a storage system associates seven user data elements to one parity element, that storage system would be described as having a 7:1 RAIN stripe. User data may be a block (e.g., a page, or other granularity) of data. Each data block may be stored at each location of the stripe. By definition, an XOR operation of all the stored data and the parity data on a RAIN stripe is zero. Thus, if a portion of a memory device that includes one of the received data blocks fails and the corresponding data is lost, then the lost data may be recalculated based on an XOR operation between the other user data blocks and the parity data stored on the stripe. As data is received from the host system, a cursor may be used to keep track at which location of the stripe the currently received data is being stored. The controller of the storage system may include an XOR calculator to perform an XOR operation that is used to calculate parity data when data from the host system is written to the storage system. As each data block is written at each location of a given stripe, the XOR calculator may calculate a parity data based on the XOR operation between all data received to date that are being stored at the current stripe. For example, the XOR calculator may calculate a running parity data every time a new data element is to be written to include the new data element in the parity calculation, until the cursor is at the end of the stripe. When the cursor reaches the end of the stripe, the running parity data may be written at the last block location of the given stripe as the parity data for the given stripe. The XOR calculator may include a buffer memory that is used to store the running parity data calculated as each of the new data elements is received, until the running parity data is stored on the stripe. The buffer memory may be on a volatile memory device providing for fast access and calculation. However, there is a risk that the data stored on the buffer may be lost before the data is written on the storage system.

For example, an event such as a power loss or hardware failure may cause the buffer memory to release or lose the running parity data therein.

In the event the running parity data from the buffer memory has to be released before the cursor has reached the end of the stripe where the parity data is to be stored, some workarounds have been used. One workaround, for example, may be to attempt to retain the parity data at the end of the stripe by padding the stripe with dummy data. With this approach, upon receiving an event indicating that a release or loss of the running parity value is imminent, the controller may write dummy data (e.g., all zeros) at subsequent locations of the stripe from where the cursor was at the time of receiving the indication, calculate the running parity data and when the cursor reaches the end of the stripe, write the running parity data at the last block location of the stripe. The parity value for the stripe may thus be retained and used at a later time as necessary to retrieve user data. However, this approach requires spending valuable resources to write the dummy data. Capacitors within memory devices may provide short time emergency power supply for the memory device in order to assist with a controlled power down process. Writing dummy data to the stripe using the emergency power supply may slow down the controlled power down process. This approach may also involve wasting memory locations to store dummy data that is not otherwise necessary to store at those locations.

In another example, to avoid padding the stripe with dummy data, a workaround may involve releasing the running parity data without storing it on the storage system, instead reconstructing the parity data based on all user data stored on the stripe once the system is in a working condition again. For example, if there is an indication of power loss, the running parity data may be allowed to be released without storing it in the storage system. Upon power up of the system, a parity data based on all the user data already stored on the stripe may be recalculated. The recalculated parity data may be used to initialize a memory buffer for calculating a new running parity value for the remainder of the data to be stored on the stripe, and eventually to be stored at the end of the stripe. However, the data stored on the stripe prior to receiving the event indication may be left unprotected until the parity data is reconstructed post power up. If one of these unprotected data block locations fails during this time, the corresponding data may not be recovered. In addition, the reconstruction of the parity value based on all previously stored data on the stripe may add overhead to the restart process and slow down the data write operations upon restart.

Aspects of the present disclosure address the above and other deficiencies by storing the running parity data at the next block location of a RAIN stripe where the next user data would have been stored if no event indication was received. Prior to storing a user data at a data block location, the controller may identify whether the location of the cursor is at a specified location (e.g., end of the stripe) where a parity data is to be stored. If it is not, the controller may store the current data at the block location indicated by the cursor, and the cursor may be incremented to move to the next block location. A running parity data may be calculated based on the previously received user data and stored in a memory buffer. For the next user data element, the running parity data and the next user data element may be used to calculate the updated running parity data and be stored on the memory buffer. When an indication is received of an event expecting release of the running parity data, the controller may store the running parity data at the data block location where the cursor is currently present. The running parity data may be released from the memory buffer. An XOR operation based on the stored data on the data stripe at that point and the parity data may produce a result of zero. Upon restart of the controller, the memory buffer may be reset with an initial value of the default hardware initialization state (e.g., zero). A subsequent parity data may be calculated based on the initial value and the subsequent user data, and may be stored on the memory buffer. When the cursor reaches the end of the stripe, the controller may store the subsequent parity data to the block location at the end of the stripe. An XOR operation based on the subsequently stored user data on the data stripe at that point and the subsequent parity data may produce a result of zero. When a data recovery is necessary for a data block of the stripe, an XOR operation may be performed on the data on the other data blocks containing the previously stored user data, the subsequently stored data, and the two parity data.

Advantages of the present disclosure include, but are not limited to, the increased performance of the storage system as the buffer memory of the XOR calculator may be stored on the storage system more efficiently, while the data protection mechanism using a redundancy operation based on the parity data may also be provided. As a result of storing the parity data at the next available block location, controlled power down of the storage system may be more efficient, complete and error free, since valuable computing resources are not wasted on writing dummy data to the storage system to be able to store the parity data at a predetermined block location. Additionally, valuable memory locations may not be wasted on writing unnecessary dummy data to memory locations. Moreover, a power up mechanism may be faster and more efficient, since reconstruction of lost parity data may no longer be required.

FIG. 1 illustrates an example computing environment 100 that includes a storage system 110. In general, the computing environment 100 may include a host system 120 that uses the storage system 110. For example, the host system 120 may write data to the storage system 110 and read data from the storage system 110.

The host system 120 may be a computing device such as a desktop computer, laptop computer, network server, mobile device, or such computing device that includes a memory and a processing device. The host system 120 may include or be coupled to the storage system 110 so that the host system 120 may read data from or write data to the storage system 110. For example, the host system 120 may be coupled to the storage system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface may be used to transmit data between the host system 120 and the storage system 110. The host system 120 may further utilize an NVM Express (NVMe) interface to access the memory devices 112A to 112N when the storage system 110 is coupled with the host system 120 by the PCIe interface As shown in FIG. 1, the storage system 110 may include a controller 111 and memory devices 112A to 112N. In some embodiments, the memory devices 112A to 112N may be based on non-volatile memory. For example, the memory devices 112A to 112N may be a negative-and (NAND) type flash memory. Each of the memory devices 112A to 112N may include one or more arrays of memory cells such as single level cells (SLCs) or multi-level cells (MLCs) (e.g., triple level cells (TLCs) or quad-level cells (QLCs)). In some embodiments, a particular memory device may include both an SLC portion and a MLC portion of memory cells. Each of the memory cells may store bits of data (e.g., data blocks) used by the host system 120. Although non-volatile memory devices such as NAND type flash memory are described, the memory devices 112A to 112N may be based on any other type of memory such as a volatile memory. For example, the memory devices 112A to 112N may be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. The memory devices 112A to 112N may include any combination of the different types of non-volatile memory and/or volatile memory. Furthermore, the memory cells of the memory devices 112A to 112N may be grouped as memory pages or data blocks that may refer to a unit of the memory device used to store data.

The controller 111 may communicate with the memory devices 112A to 112N to perform operations such as reading data, writing data, or erasing data at the memory devices 112A to 112N and other such operations. The controller 111 may include hardware such as one or more integrated circuits and/or discrete components, a processing device, a buffer memory, software such as firmware or other instructions, or a combination thereof. In general, the controller 111 may receive commands or operations from the host system 120 and may convert the commands or operations into instructions or appropriate commands to achieve the desired access to the memory devices 112A to 112N. The controller 111 may be responsible for other operations such as wear leveling operations, garbage collection operations, error detection and error-correcting code (ECC) operations, encryption operations, caching operations, and address translations between a logical block address and a physical block address that are associated with the memory devices 112A to 112N. The controller 111 may further include host interface circuitry to communicate with the host system 120 via the physical host interface. The host interface circuitry may convert the commands received from the host system into command instructions to access the memory devices 112A to 112N as well as convert responses associated with the memory devices 112A to 112N into information for the host system 120.

Referring to FIG. 1, the controller 111 may include a parity data handler 113 that may be used to store parity data from one or more buffer memories of an XOR calculator of the storage system. For example, the parity data handler 113 may utilize data received from the host system 120 that are to be stored at the memory device 112A to 112N. As the data from the host system 120 are received to be stored at the storage system, the parity data handler 113 may generate parity data and store the parity data at a buffer memory. Upon receiving an indication of an event (e.g., power loss, hardware failure), the parity data generated by the parity data handler 113 may be stored at a next available memory location of the storage system. Upon restart of the storage system, the parity data handler 113 may initialize the buffer memory with a value of zero, continue to calculate parity data for subsequent data received from host system 120, and store the parity data at the end of a data stripe on the storage system. Further details with regards to the operations of the parity data handler 113 are described below.

The storage system 110 may include additional circuitry or components that are not illustrated. For example, the storage system 110 may include a cache or buffer (e.g., DRAM) and address circuitry (e.g., a row decoder and a column decoder) that may receive an address from the controller 111 and decode the address to access the memory devices 112A to 112N.

Figure 2:
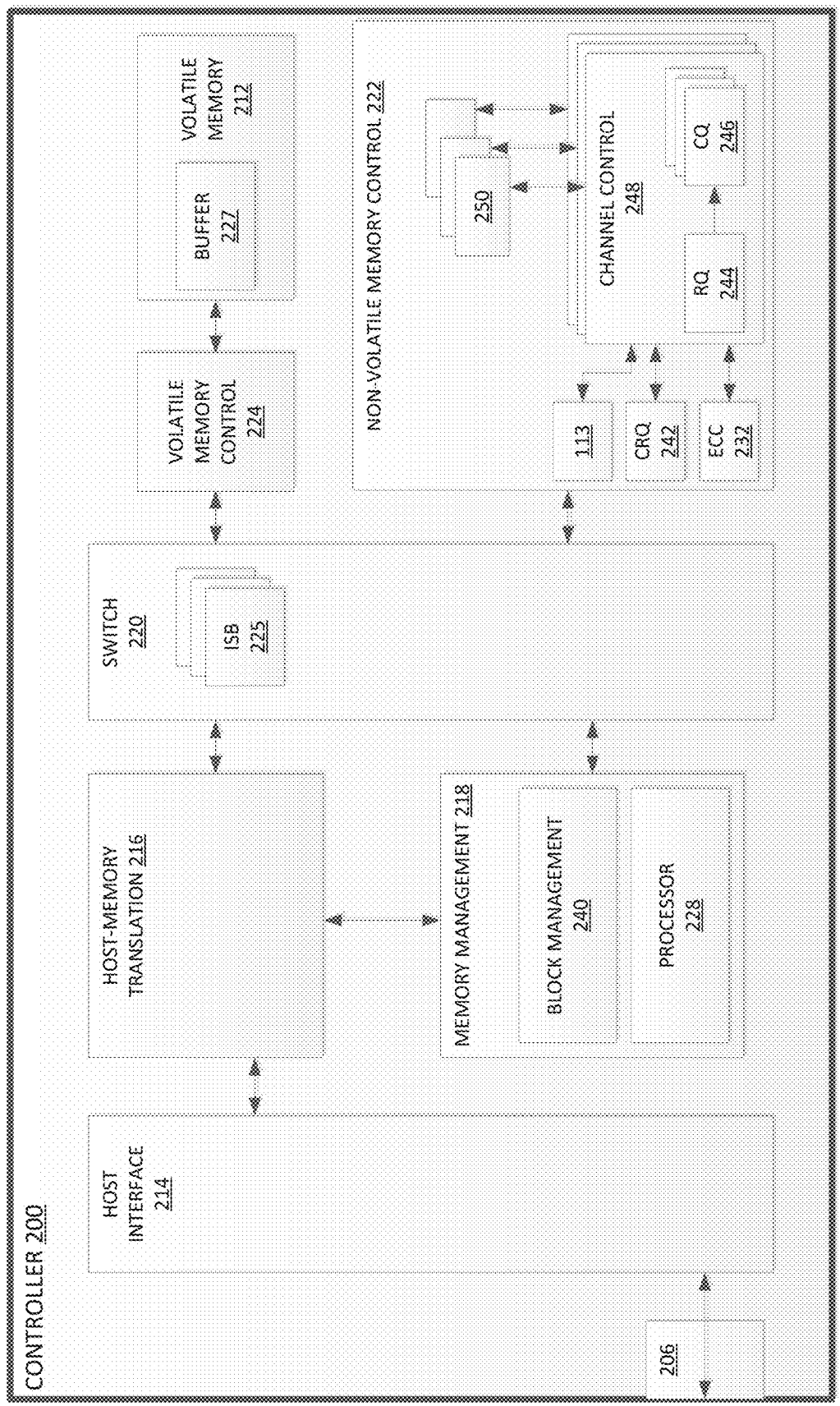
FIG. 2 is a block diagram of an example controller of the storage system in accordance with some embodiments.

FIG. 2 is a block diagram of an example controller 200 of a storage system. In general, the controller 200 may correspond to the controller 111 of FIG. 1.

As shown in FIG. 2, a non-volatile memory may include a number of memory units 250 and the controller 200 may include a volatile memory 212. A memory unit 250 may be a portion (e.g., a memory page, physical data block, a die of a memory device, etc.) of non-volatile memory that may be independently controllable by the controller 200. The controller 200 may include a host interface circuitry 214 to interface with a host system via a physical host interface 206. The controller may further include host-memory translation circuitry 216, memory management circuitry 218, switch 220, non-volatile memory control circuitry 222, and/or volatile memory control circuitry 224.

The host interface circuitry 214 may be coupled to host-memory translation circuitry 216. The host interface circuitry 214 may interface with a host system. In general, the host interface circuitry 214 may be responsible for converting command packets received from the host system into command instructions for the host-memory translation circuitry 216 and for converting host-memory translation responses into host system commands for transmission to the requesting host system.

Referring to FIG. 2, the host-memory translation circuitry 216 may be coupled to the host interface circuitry 214, to the memory management circuitry 218, and/or to the switch 220. The host-memory translation circuitry 216 may be configured to translate host addresses to memory addresses (e.g., addresses associated with a received command such as a read and/or write command from the host system). For example, the host-memory translation circuitry 216 may convert logical block addresses (LBAs) specified by host system read and write operations to commands directed to specific memory units 250 (e.g., physical block addresses). The host-memory translation circuitry 216 may include error detection/correction circuitry, such as exclusive or (XOR) circuitry that may calculate parity information based on information received from the host interface circuitry 214.

The memory management circuitry 218 may be coupled to the host-memory translation circuitry 216 and the switch 220. The memory management circuitry 218 may control a number of memory operations including, but not limited to, initialization, wear leveling, garbage collection, reclamation, and/or error detection/correction. While the memory management circuitry 218 may include a processor 228, a number of embodiments of the present disclosure provide for control of memory operations in circuitry (e.g., without relying on the execution of instructions such as software and/or firmware) by the processor 228. Memory management circuitry 218 may include block management circuitry 240 to retrieve data from the volatile memory 212 and/or memory units 250 of non-volatile memory. For example, the block management circuitry 240 may retrieve information such as identifications of valid data blocks of the memory units 250, erase counts, and other status information of the memory units 250 to perform memory operations.

The switch 220 may be coupled to the host-memory translation circuitry 216, the memory management circuitry 218, the non-volatile memory control circuitry 222, and/or the volatile memory control circuitry 224. The switch 220 may include and/or be coupled to a number of buffers. For example, the switch 220 may include internal static random access memory (SRAM) buffers (ISBs) 225. The switch may be coupled to DRAM buffers 227 that are included in the volatile memory 212. In some embodiments, the switch 220 may provide an interface between various components of the controller 200. For example, the switch 220 may account for variations in defined signaling protocols that may be associated with different components of the controller 200 in order to provide consistent access and implementation between different components.

The non-volatile memory control circuitry 222 may store information corresponding to a received read command at one of the buffers (e.g., the ISBs 225 or the buffer 227). Furthermore, the non-volatile memory control circuitry 222 may retrieve the information from one of the buffers and write the information to a corresponding memory unit 250 of the non-volatile memory. The number of memory units 250 may be coupled to the non-volatile memory control circuitry 222 by a number of channels. In some embodiments, the number of channels may be controlled collectively by the non-volatile memory control circuitry 222. In some embodiments, each memory channel may be coupled to a discrete channel control circuit 248. A particular channel control circuit 248 may control and be coupled to more than one memory unit 250 by a single channel.

As shown in FIG. 2, the non-volatile memory control circuitry 222 may include a channel request queue (CRQ) 242 that is coupled to each of the channel control circuits 248. Furthermore, each channel control circuit 248 may include a memory unit request queue (RQ) 244 that is coupled to multiple memory unit command queues (CQs) 246. The CRQ 242 may be configured to store commands (e.g., write requests or read requests) shared between channels, the RQ 244 may be configured to store commands between the memory units 250 on a particular channel, and the CQ 246 may be configured to queue a current command and a next command to be executed subsequent to the current command.

The CRQ 242 may be configured to receive a command from the switch 220 and relay the command to one of the RQs 244 (e.g., the RQ 244 associated with the channel that is associated with the particular memory unit 250 for which the command is targeted). The RQ 244 may be configured to relay a first number of commands for a particular memory unit 250 to the CQ 246 that is associated with the particular memory unit 250 in an order that the first number of commands were received by the RQ 244. A command pipeline may structured such that commands to a same memory unit 250 move in a particular order (e.g., in the order that they were received by the RQ 244). The RQ 244 may be configured to queue a command for a particular memory unit 250 in response to the CQ 246 associated with the particular memory unit 250 being full and the CRQ 242 may be configured to queue a command for a particular RQ 244 in response to the particular RQ 244 being full.

The RQ 244 may relay a number of commands for different memory units 250 to the CQs 246 that are associated with the different memory units 250 in an order according to a status of the different memory units 250. For example, the status of the different memory units 250 may be a ready/busy status. The command pipeline is structured such that the commands between different memory units 250 may move out of order (e.g., in an order that is different from the order in which they were received by the RQ 244 according to what is efficient for overall memory operation at the time). For example, the RQ 244 may be configured to relay a first one of the second number of commands to a first CQ 246 before relaying a second command from the second number of commands to a second CQ 246 in response to the status of the different memory unit 250 associated with the second CQ 246 being busy, where the first command is received later in time than the second command. The RQ 244 may be configured to relay the second command to the second CQ 246 in response to the status of the memory unit 250 associated with the second CQ 246 being ready (e.g., subsequent to relaying the first command).

In some embodiments, the control circuits for each channel may include discrete error detection/correction circuitry 232 (e.g., error correction code (ECC) circuitry), coupled to each channel control circuit 248 and/or a number of error detection/correction circuits 232 that can be used with more than one channel. The error detection/correction circuitry 232 may be configured to apply error correction such as Bose-Chaudhuri-Hocquenghem (BCH) error correction to detect and/or correct errors associated with information stored in the memory units 250. The error detection/correction circuitry 232 may be configured to provide differing error correction schemes for SLC, MLC, or QLC operations. The non-volatile memory control circuitry 222 may further include the parity data handler 113 of FIG. 1 to store data from a buffer memory associated with the controller 200. Although the parity data handler 113 is illustrated to be within the non-volatile memory control circuitry 222, the functionality of the parity data handler 113 may be implemented at another location within the controller 200 (e.g., the processor 228).

Figure 3:
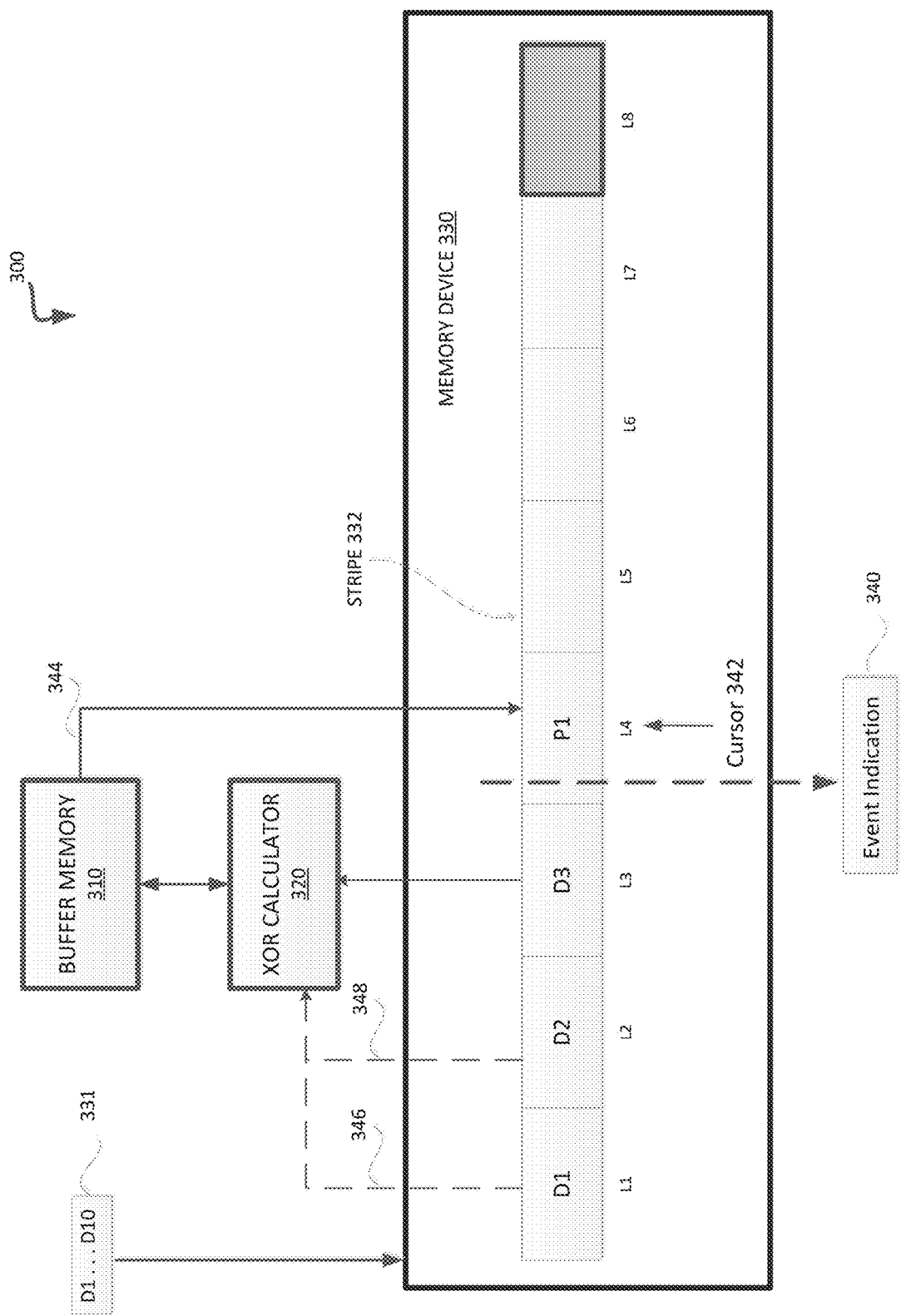
FIG. 3 illustrates the storing of parity data at a particular data block location situated prior to another data block location on a data block stripe at a storage system in accordance with some embodiments of the present disclosure.

FIG. 3 illustrates the storing of parity data at a particular data block location situated prior to another data block location on a data block stripe at a storage system 300. In general, the storage system 300 may correspond to the storage system 110 of FIG. 1.

As shown in FIG. 3, the storage system 300 may include one or more memory device 330, a buffer memory 310, and an XOR calculator 320. In some examples, the buffer memory 310 and the XOR calculator 320 may be components of a controller of the storage system 300. In some examples, the buffer memory 310 and/or the XOR calculator 320 may be part of the parity data handler 113 as described in FIG. 1. During runtime, a plurality of user data from the host system may be received by the storage system 300. The plurality of user data may be a series of user data to be written logically and sequentially on the storage system. For example, data from a series of write requests may be received to be stored at the memory device 330. The controller may identify a plurality of data block locations of the memory device 330 on storage system 300 where the received user data may be stored. The plurality of data block locations may be a series of data block locations where the series of user data may be written sequentially.

In an implementation, the plurality of data block locations may be a "stripe" of data having a predefined number of data blocks on a segment of the memory device. In an example, the received data may be stored on stripe 332 of memory device 330. Stripe 332 may be a stripe that has eight data block locations L1-L8. Stripe 332 may be a RAIN stripe that is used to store user data and parity data based on the user data stored on the stripe using an XOR operation. In the event where one of the data block locations L1-L7 experiences a failure and corresponding user data cannot be retrieved from that location, the parity data stored on stripe 332 may be used to restore the lost data. There may be a specified number of user data blocks and parity data blocks predefined for stripe 332. For example, stripe 332 may be a "7:1 RAIN stripe" which indicates that the stripe includes a total of 8 data blocks, and the predefined number of user data blocks is seven and the predefined number of parity blocks is one. The block location to store the parity data for the stripe may be a specified location. For example, the controller may specify the last block location on stripe 332 to be the predetermined block location where the parity data is to be stored. For a 7:1 RAIN stripe such as stripe 332, the controller may identify the stripe length to be eight data blocks, and identify the eighth block location L8 to be the specified block location on stripe 332 where the parity data is to be stored based on prior user data stored in block locations L1-L7 on stripe 332.

In an implementation, as the series of data is received, a cursor may keep track of the block location where the data is to be stored. A cursor may be a key that is used for navigating memory locations to store data logically and sequentially, where the key moves to a next available location in the plurality of block locations as data is stored on each block location. For example, cursor 342 may indicate the current location that is available for storing a current data of a series of received user data. As the series of user data is received, the controller may store a first user data element of the series of user data elements to a first available data block location, as indicated by the cursor, of the identified plurality of data block locations. A parity data value may be calculated for the series of user data and stored in a memory buffer as a running parity data. The parity data may be calculated using an XOR operation, and may be known as an "XOR context" when stored on the memory buffer. As subsequent user data is received, the user data may be stored on subsequent locations and for each subsequent user data, the running parity value may be used to calculate a new parity value that takes into consideration each subsequent user data.

For example, a series of data blocks 331 with user data D1 through D10 may be received from the host system. The cursor 342 may indicate that block location L1 is the next available block location on stripe 332 to store data. A first data block D1 of the series of data blocks 331 may be stored at data block location L1 of stripe 332 on the memory device 330. The first data block may also be received by the XOR calculator 320. The buffer memory may contain an initial value of zero. The XOR calculator may perform an XOR operation between the received data D1 and initial value zero from buffer memory, and store the resulting parity data value at the buffer memory 310 as the XOR context. Subsequently, a second data block D2 may be received and stored at data block location L2 (as indicated by the cursor 342) on the memory device 330. Furthermore, the XOR calculator 320 may receive the second data block D2, retrieve the first parity value (e.g., the XOR context) stored at the buffer memory 310, and generate an intermediate parity data value based on a combination of the first data block and the second data block (e.g., an XOR combination) and may store the intermediate parity data value at the buffer memory 310 as a running parity data value for stripe 332. Similarly, a third data block D3 may be received and stored at data block location L3 of the memory device 330. Furthermore, the XOR calculator 320 may receive the third data block D3, retrieve the intermediate parity data value from the buffer memory 310, and generate parity data P1 based on a combination of the intermediate parity data value and the third data block D3. The dotted lines 346 and 348 on FIG. 3 are used to indicate that the XOR calculator 320 takes into consideration data D1 and data D2 along with data D3.

The process may continue for each received user data of D1-D10 of series 331 until the cursor indicates that the next available data block location is the specified location (e.g., L8) for storing the parity data for the stripe. When the cursor indicates that L8 is reached, the running parity value from buffer memory 310 may be stored at data block location L8 and released from buffer memory 310. After the parity data is stored at stripe 332 on the memory device 330, a new parity data value may be generated for a new stripe (e.g., based on combinations of a subsequent data blocks).

In one example, the controller may receive an event indication. For example, an event indication may be an indication that the running parity data (e.g., the XOR context) needs to be released or allowed to be let go from the buffer memory. There may be various reasons for releasing the parity data from the buffer memory. For example, a power loss associated with one of the components of the storage system may necessitate release of the parity data from the buffer memory. In another example, hardware resource limitations may be a reason for releasing the parity value from the buffer memory. For example, multiple cursors may share hardware resources (e.g., buffer memories) and a situation may arise when there is not sufficient number of buffer memories to support the number of cursors being used at a given time. If two cursors use the same buffer memory, there may be a need to let go of the parity data value for a first of the two cursors from the buffer memory, keep using the buffer memory to store parity data associated with a second cursor while the second cursor continues to run until the second cursor is done using the buffer memory, and return to the first cursor to complete running the first cursor while using the buffer memory for storing the parity value associated with the first cursor. An event indication may be generated in such a scenario indicating a hardware limitation associated with the storage system. The event indication may provide additional details, such as the identification of the cursor associated with the release of the parity data from buffer memory, the identification of the cursor which is to continue running, etc. For example, after data D3 has been stored on location L3, the cursor may be on location L4. The controller may determine that L4 is not the specified location for storing the parity data for the stripe and select data block location L4 to store the current user data (e.g., D4) of the series 331. At this point, the controller may receive an event indication 340. In an example, the event indication 340 may indicate a power loss associated with the storage system 330 will be initiated.

Upon receiving an event indication, the controller may store the running parity data from the buffer memory at the data block location where the cursor is currently present. The data block location may be the next available data block location that was selected for storing a user data. However, in response to receiving the indication of an occurrence of the event, the controller may store the running parity data, instead of the user data, to a particular location indicated by the cursor. The particular block location may be situated prior to the specified location where the parity data for the plurality of block locations is to be stored. For example, in response to receiving event indication 340, the running parity data 344 from the buffer memory 310 may be stored at data block location L4 as P1. L4 is indicated by the cursor to be the next available data block location and was selected to store the current user data (e.g., D4) of the series 331. L4 may be a data block location that is situated on stripe 332 prior to the specified location L8 for the parity value for the stripe. The running parity data 344 may be released from the buffer memory 310. By definition, a value based on an XOR operation on user data D1, D2, D3 and parity data P1 may produce a result of a value of zero.

Figure 4:
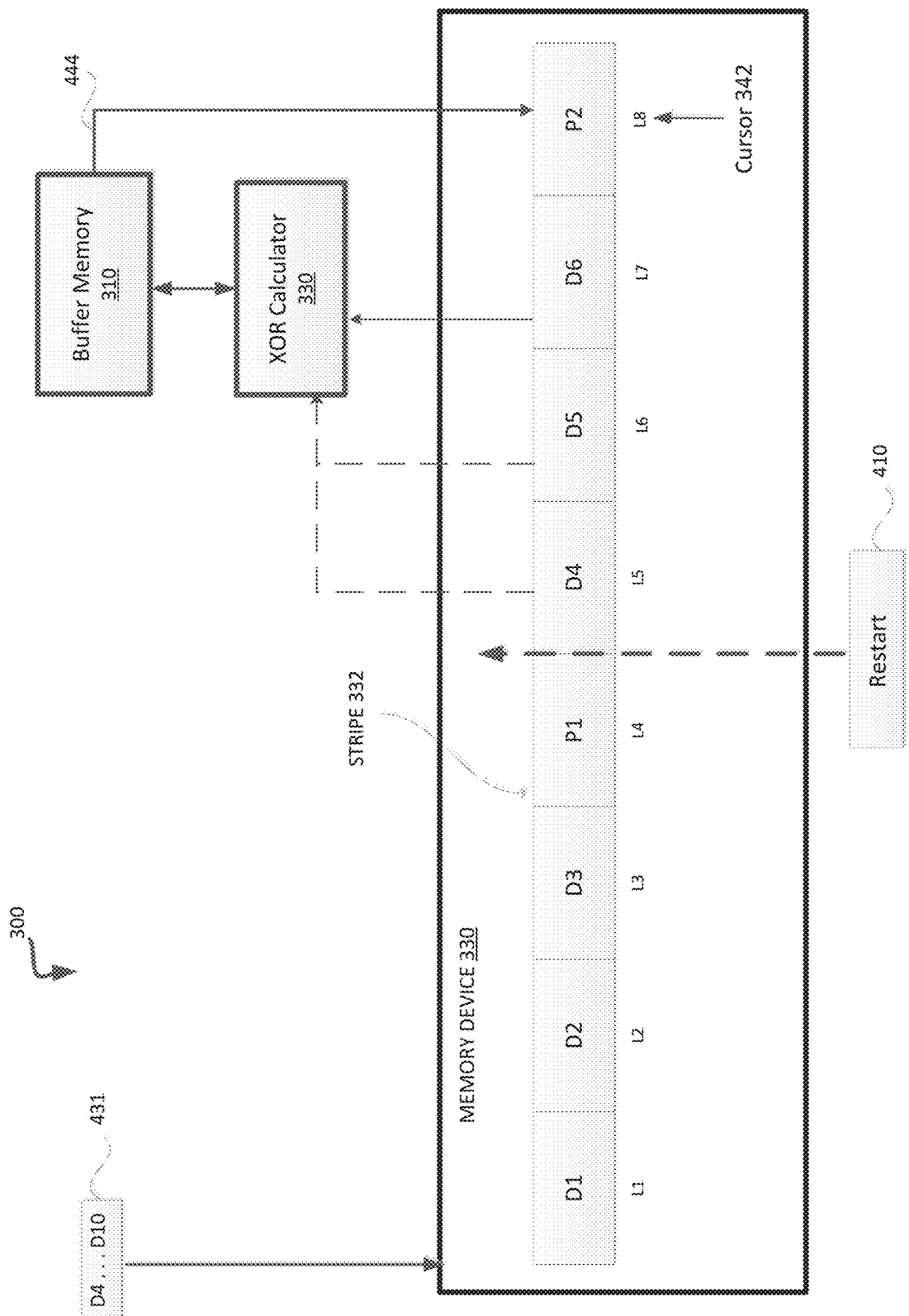
FIG. 4 illustrates the storing of another parity data at another data block location situated after the particular data block location on a data block stripe at a storage system in accordance with some embodiments of the present disclosure.

FIG. 4 illustrates the storing of another parity data at another data block location situated after the particular data block location on a data block stripe at the storage system 300. In general, the storage system 300 may correspond to the storage system 110 of FIG. 1.

Upon restart of the controller, the controller may receive a plurality of subsequent data from the host system to be written to the memory device 330. The controller may identify the plurality of data blocks partially containing prior data from the host system to store the plurality of subsequent data. The memory buffer may be set with an initial value of the default hardware initialization state (e.g., zero). A subsequent parity data may be calculated based on the initial zero value and the subsequent user data, and may be stored on the memory buffer as a running parity data. When the cursor reaches the specified block location for parity data, the controller may store the running parity data at the specified block location as another parity data. An XOR operation based on the subsequently stored user data on the data stripe and the subsequent parity data may produce a result of zero by definition.

For example, as depicted in FIG. 4, the storage system 330 may be operative at restart 410. The controller of the storage system 330 may receive a series of data 431 with data D4 through D10. The controller may identify stripe 332 for storing the subsequently received data. The controller may identify L8 to be the specified location for storing the parity data based on the length of stripe 332. Cursor 342 may indicate the next available data block location to be L5 and the controller may store data D4 at location L5. Data D4 may also be received by the XOR calculator 320. The buffer memory 310 may be set to an initial value equal to the default hardware initialization state. The default hardware initialization state may be a value of zero. The XOR calculator 320 may perform an XOR operation between the subsequent user data D1 stored at subsequent location L5 and the initial value zero from buffer memory 310, and store the resulting parity data value at the buffer memory 310 as the subsequent running parity data. User data D5 and D6 may be stored at locations L6 and L7, respectively, and a running parity data may be generated using the XOR calculator 330, following the same manner as described with reference to data D2-D3 and running parity data in FIG. 3. When the cursor 342 reaches the data block location L8, the controller may determine that the cursor 342 is at the specified location for the parity data for the stripe 332 and store the running parity data 444 to location L8 as parity data P2. L8 may be a data block location that is situated on stripe 332 after the particular location L4 where the previous parity data has been stored. The running parity data 444 may be released from the buffer memory 310. By definition, a value based on an XOR operation on user data D4, D5, D6 and parity data P2 may produce a result of a value of zero.

In the event of a failure of the memory device 330 or a particular die of the memory device 330, one of the data blocks from the stripe 332 may be lost if the data block is stored at the failed memory location or failed die. In response to such a failure, the remaining data blocks and the parity data from the stripe 332 may be retrieved and an XOR operation may be performed between the remaining data blocks and the stored parity data to generate the lost data block from the stripe 332. The newly generated data block may then be subsequently stored at another memory device or another die of a memory device. When a data recovery is necessary for a data block of the stripe, an XOR operation may be performed on the data on the other data blocks containing the previously stored user data, the subsequently stored user data, and the two parity data. Since the XOR operation based on user data D1, D2, D3 and parity data P1 results into a value of zero, and an XOR operation based on user data D4, D5, D6 and parity data P2 results into a value of zero, an XOR operation based on the two resulting values of zero (e.g., based on data at locations L1-L4 and L5-L8) may also produce a value of zero. As such, if one of the data block locations of L1-L8 fails, an XOR operation based on data at all the remaining locations may reproduce the lost data. Thus, the controller may not need to keep track of the location(s) where the parity data was stored mid stripe after the event indication was received and no additional operations may need to be performed to retrieve a lost data from a stripe containing a mid stripe parity data than a stripe containing one parity data at the known, specified location.

Although FIGS. 3 and 4 illustrate a stripe of data block as including six data blocks and two parity data, different number of data blocks and parity data may be included in a stripe.

In another implementation, the running parity data may be stored at an alternate location (e.g., a persistent storage) before releasing it from the memory buffer, instead of storing it at the next available location on the stripe. This may be useful when dealing with limited time and resources in order to prioritize the controlled power down process, for example, when a power loss happens. Then upon restart, the parity data may be transferred to the stripe location where the cursor is present, continue storing subsequent user data at the subsequent locations of the stripe and initialize the memory buffer with a hardware default initialization state of zero.

Figure 5:
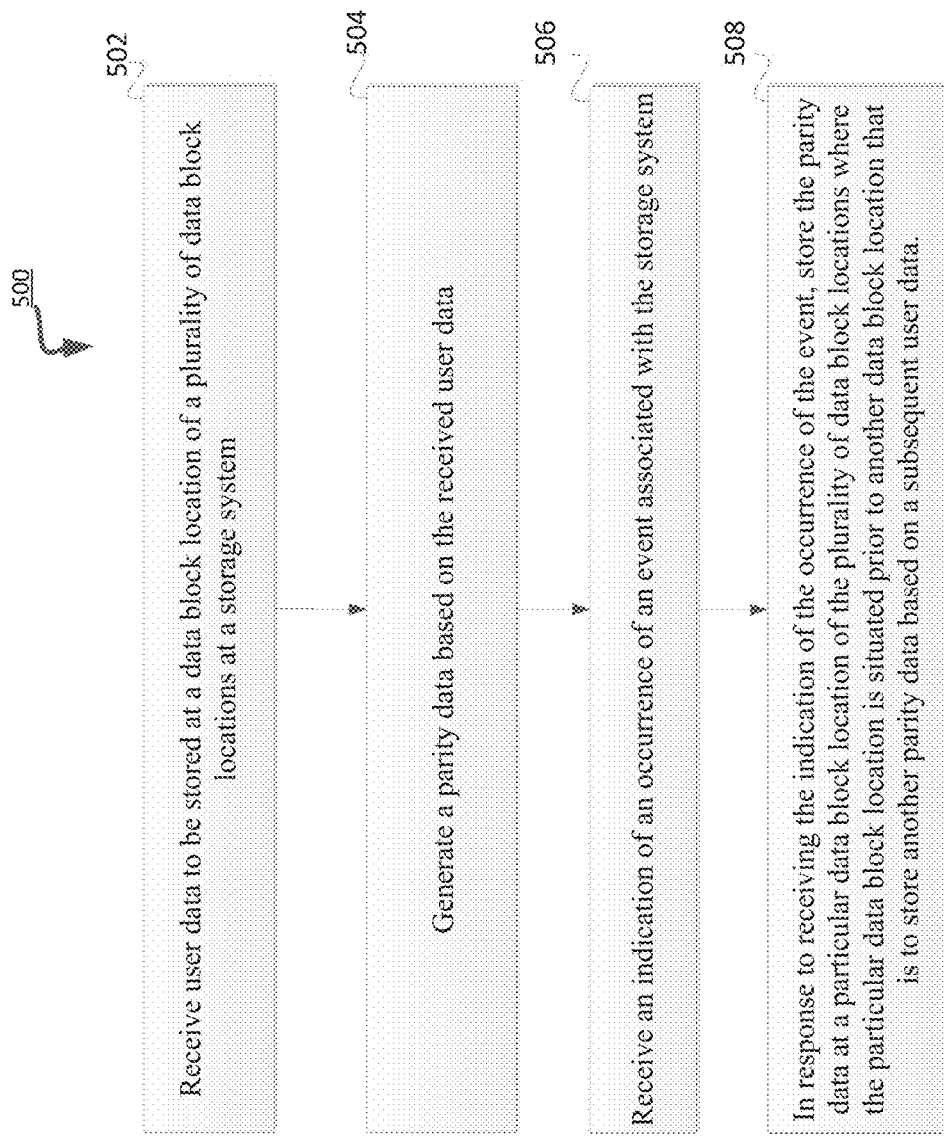
FIG. 5 is a flow diagram of an example method to store a parity data at a particular location prior to another location on a data block stripe in accordance with some embodiments of the present disclosure.

FIG. 5 is a flow diagram of an example method 500 for storing parity data. The method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 may be performed by the parity data handler 113 of the controller 111 of FIG. 1.

As shown in FIG. 5, the method 500 may begin, at block 502, with processing logic receiving user data to be stored at a data block location of a plurality of data block locations at a storage system. For example, the plurality of data block locations may be a single data block stripe. At block 504, the processing logic may generate a parity data based on the received user data. For example, the parity data may be generated by performing an XOR operation on a combination of the received user data and stored at a memory as a running parity data.

At block 506, the processing logic may receive an indication of an occurrence of an event associated with the storage system. For example, an event indication may include an indication that the running parity data (e.g., the XOR context) needs to be released or allowed to be let go from the buffer memory. There may be various reasons for releasing the parity data from the buffer memory. For example, the event may correspond to a power loss associated with the storage system. In another example, the event may correspond to a hardware limitation associated with the storage system.

At block 508, in response to receiving the indication of the occurrence of the event, the processing logic may store the parity data at a particular data block location of the plurality of data block locations. For example, the particular data block location may be situated prior to another data block location (e.g., a second location), of the plurality of data block locations, that is to store another parity data (e.g., a subsequent parity data) based on a subsequent user data. For example, the second location may be situated at the end of the plurality of data block locations. Thus, a single stripe may include two different parity data values that are stored at two different data block locations of the same stripe. The processing logic may further set a memory previously storing the parity data to an initial value of a default hardware initialization state (e.g., zero) after storing the parity data at the particular data block location. Alternatively, the processing logic may reset a memory storing the parity data by replacing the parity data stored at the memory with an initial value of zero after storing the parity data at the particular data block location. The processing logic may generate the subsequent parity data based on the initial value at the memory and the subsequent user data, and store the subsequent parity data in the second data block location. The stored user data, the parity data and the subsequent parity data may be used to recover a user data stored at one of the data block locations of the plurality of data block locations in the event the user data is lost from that block location.

Figure 6:
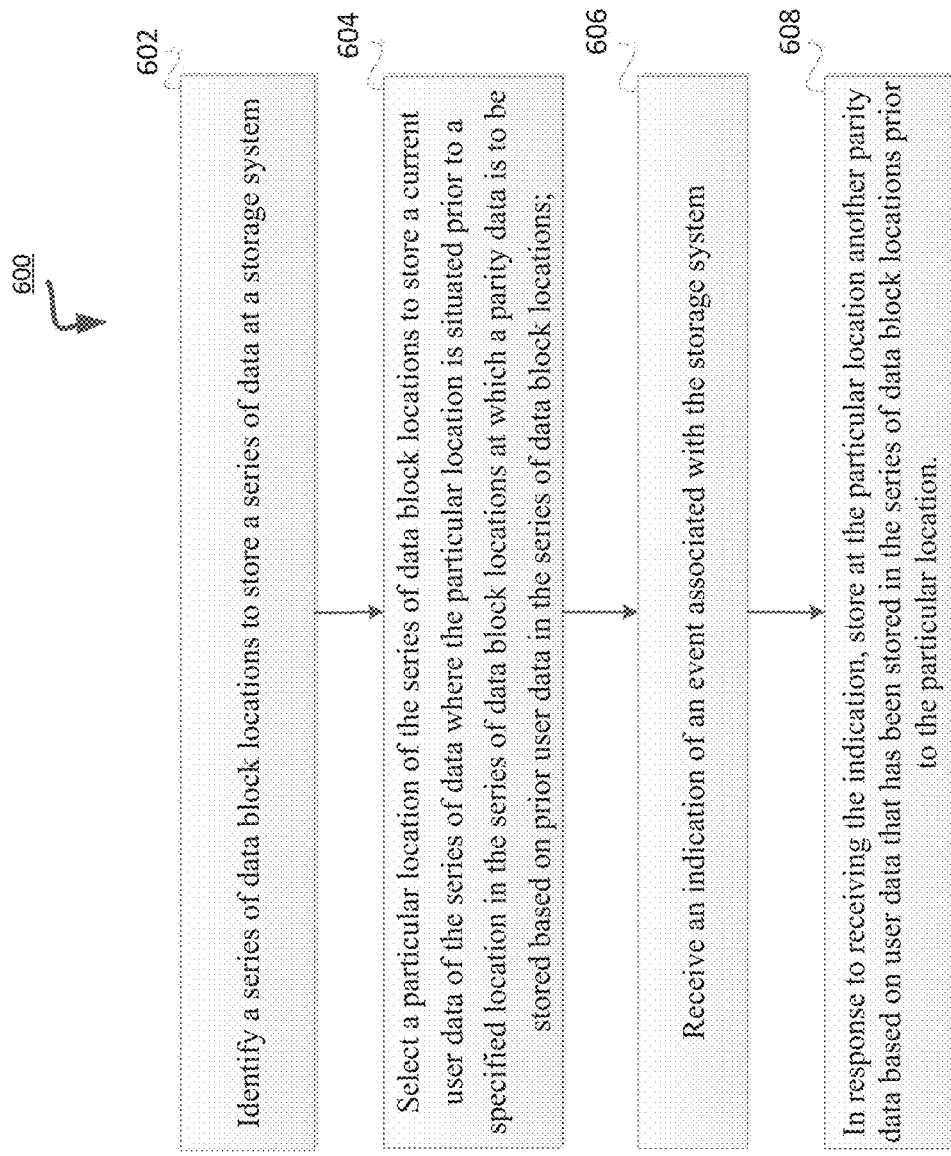
FIG. 6 is a flow diagram of an example method to store a parity data at a particular location prior to another location on a data block stripe in accordance with some embodiments of the present disclosure.

FIG. 6 is a flow diagram of an example method 600 for storing parity data. The method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 may be performed by the parity data handler 113 of the controller 111 of FIG. 1.

As shown in FIG. 6, the method 600 may begin, at block 602, with processing logic identifying a series of data block locations to store a series of data at a storage system. For example, the series of data block locations may include a single data block stripe. At block 604, the processing logic may select a particular location of the series of data block locations to store a current user data of the series of data. For example, the particular location may be situated prior to a specified location in the series of data block locations where a parity data is to be stored based on prior user data in the series of data block locations. The prior user data in the series may be stored at locations situated prior to the specified location in the series. For example, the specified location may be the last data block location on a single data stripe.

At block 606, the processing logic may receive an indication of an event associated with the storage system. For example, the event may correspond to a power loss associated with the storage system. In another example, the event may correspond to a hardware limitation associated with the storage system, such as not having enough hardware memory buffers to store a running parity data on the storage system.

At block 608, the processing logic may, in response to receiving the indication, store at the particular location another parity data (e.g., a second parity data) based on user data that has been stored in the series of data block locations prior to the particular location. For example, the second parity data may be generated by performing an XOR operation on a combination of the received user data. The processing logic may further set a memory segment previously storing the second parity data to an initial value of a default hardware initialization state (e.g., zero) after storing the second parity data at the particular location. The processing logic may generate a subsequent parity data based on the initial value of the default hardware initialization state and subsequent user data stored at subsequent locations situated after the particular location in the series of data block locations, and store the subsequent parity data in the specified location. The stored user data, the second parity data and the subsequent parity data may be used to recover a user data stored at one of the data block locations of the plurality of data block locations in the event the user data is lost from that block location.

Figure 7:
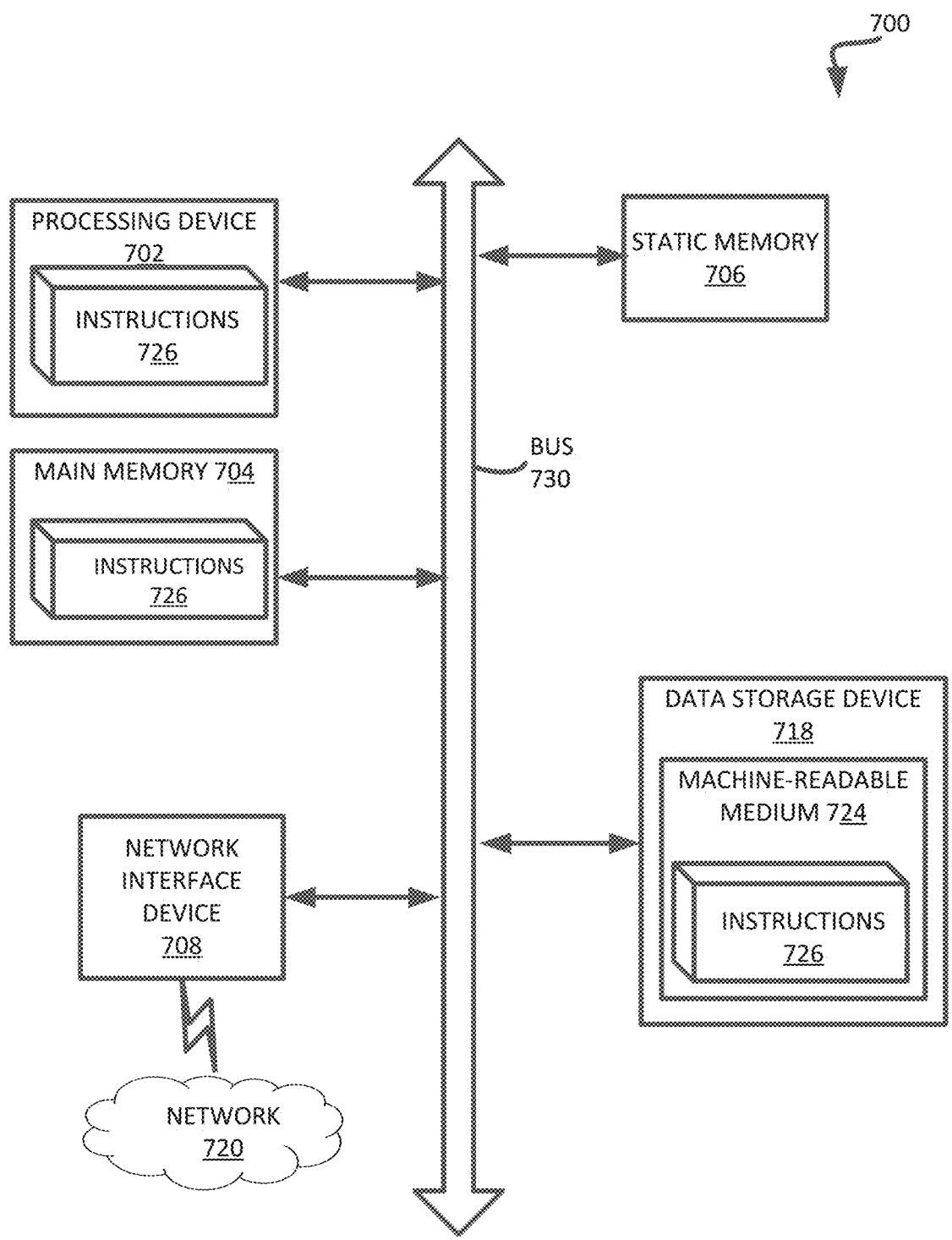
FIG. 7 is a block diagram of an example computer system in which implementations of the present disclosure may operate.

FIG. 7 illustrates an example machine of a computer system 700 within which a set of instructions, for causing the machine to perform any one or more of the methodologies discussed herein, may be executed. For example, the computer system 700 may correspond to a host system (e.g., the host system 120 of FIG. 1) that includes or utilizes a storage system (e.g., the storage system 110 of FIG. 1) or may be used to perform the operations of a controller (e.g., to execute an operating system to perform operations corresponding to the parity data handler 113 of FIG. 1). In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730. Processing device 702 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 may further include a network interface device 708 to communicate over the network 720.

The data storage system 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 may correspond to the storage system 110 of FIG. 1.

In one implementation, the instructions 726 include instructions to implement functionality corresponding to a parity data handler (e.g., parity data handler 113 of FIG. 1). While the machine-readable storage medium 724 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure may refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus may be specially constructed for the intended purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
    identifying a first data block location that is predetermined to store a first parity data based on a plurality of user data at a plurality of data block locations of a storage system;
    storing a set of user data at a subset of data block locations of the plurality of data block locations;
    storing a second parity data at a memory buffer location, wherein the second parity data is generated based on the set of user data;
    receiving an indication of an occurrence of an event associated with the storage system;
    in response to receiving the indication of the occurrence of the event, storing, by a processing device, the second parity data at a second data block location of the plurality of data block locations, wherein the second data block location is situated after the subset of the plurality of data block locations and prior to the first data block location; and
    replacing the second parity data in the memory buffer with an initial value of a default hardware initialization state of the storage system to allow for calculating additional parity data based on the initial value and additional user data to be stored in one or more data block locations situated after the second data block location.

2. The method of claim 1, wherein the plurality of data block locations corresponds to a single data block stripe.

3. The method of claim 1 wherein the initial value of the default hardware initialization state is zero.

4. The method of claim 1, further comprising:
    generating the first parity data based on the initial value of the default hardware initialization state and the additional user data stored in data block locations situated between the second data block location and the first data block location; and
    storing the first parity data in the first data block location.

5. The method of claim 1, wherein the first data block location is situated at the end of the plurality of data block locations.

6. The method of claim 1, wherein the event corresponds to a power loss associated with the storage system.

7. The method of claim 1, wherein the event corresponds to a hardware limitation associated with the storage system.

8. The method of claim 1, wherein the first parity data and the second parity data are used to recover a user data stored at one of the data block locations of the plurality of data block locations.

9. A system comprising:
a memory;
a processing device, operatively coupled with the memory, to:
identify a series of data block locations to store a series of data at a storage system;
identify a first data block location in the series of data block locations that is predetermined to store a first parity data based on a plurality of user data at the series of data block locations;
select a second data block location of the series of data block locations to store a particular user data of the series of data, wherein the second data block location is situated prior to the first data block location in the series of data block locations;
store a second parity data at a memory buffer location in view of user data that has been stored in the series of data block locations prior to the second data block location;
receive an indication of an event associated with the storage system;
in response to receiving the indication, store the second parity data at the second data block location; and
replace the second parity data in the memory buffer with an initial value of a default hardware initialization state of the storage system to allow for calculating additional parity data based on the initial value and additional user data to be stored in one or more data block locations of the series of data block locations after the second data block location.

10. The system of claim 9, wherein the series of data block locations comprises a single data block stripe.

11. The system of claim 9 wherein the initial value of the default hardware initialization state is zero.

12. The system of claim 9, wherein the processing device is further to:
generate the first parity data based on the initial value of the default hardware initialization state and the additional user data stored in the series of data block locations situated between the second data block location and the first data block location; and
store the first parity data in the first data block location.

13. The system of claim 9, wherein the first data block location is situated at the end of the series of data block locations.

14. The system of claim 9, wherein the event corresponds to a power loss associated with the storage system.

15. A non-transitory computer-readable medium comprising instructions that, when executed by a processing device, cause the processing device to perform operations comprising:
identifying a first data block location that is predetermined to store a first parity data based on a plurality of user data at a plurality of data block locations of a storage system;
storing a set of user data at a subset of data block locations of the plurality of data block locations;
storing a second parity data at a memory buffer location, wherein the second parity data is generated based on the set of user data;
receiving an indication of an occurrence of an event associated with the storage system;
in response to receiving the indication of the occurrence of the event, storing the second parity data at a second data block location of the plurality of data block locations, wherein the second data block location is situated after the subset of the plurality of data block locations and prior to the first data block location, of the plurality of data block locations; and
replacing the second parity data in the memory buffer with an initial value of a default hardware initialization state of the storage system to allow for calculating additional parity data based on the initial value and additional user data to be stored in one or more data block locations situated after the second data block location.

16. The non-transitory computer-readable medium of claim 15, wherein the plurality of data block locations corresponds to a single data block stripe.

17. The non-transitory computer-readable medium of claim 15 wherein the initial value of the default hardware initialization state is zero.

18. The non-transitory computer-readable medium of claim 17, wherein the first data block location is situated at the end of the plurality of data block locations.

19. The non-transitory computer-readable medium of claim 15, wherein the event corresponds to a power loss associated with the storage system.

20. The non-transitory computer-readable medium of claim 15, wherein the event corresponds to a hardware limitation associated with the storage system.

* * * * *